United States Patent [19]

Kolb et al.

[11] Patent Number: 5,262,490

[45] Date of Patent: Nov. 16, 1993

US005262490A

[54] FLUOROELASTOMER COMPOSITION WITH ORGANO-ONIUM COMPOUNDS

[75] Inventors: Robert E. Kolb, St. Paul; Werner M. Grootaert, Oakdale, both of Minn.

[73] Assignee: Minnesota Mining and Manufacturing Company, St. Paul, Minn.

[21] Appl. No.: 934,430

[22] Filed: Aug. 24, 1992

[51] Int. Cl.$^5$ .................. C08F 8/40; C08F 8/34; C08F 14/22

[52] U.S. Cl. .................. 525/343; 525/326.3; 525/340; 525/341; 525/348; 525/349; 525/379

[58] Field of Search .......... 525/326.3, 331, 340, 525/341, 343, 348, 349, 379

[56] References Cited

U.S. PATENT DOCUMENTS

| | | | |
|---|---|---|---|
| 3,752,787 | 8/1973 | de Brunner | 260/41 B |
| 3,753,937 | 8/1973 | Stivers | 260/28.5 |
| 3,876,654 | 4/1975 | Pattison | 260/38.87 |
| 4,102,876 | 7/1978 | Brenner et al. | 525/341 |
| 4,233,421 | 11/1980 | Worm | 525/341 |
| 4,259,463 | 3/1981 | Moggi et al. | 525/331 |
| 4,287,320 | 9/1981 | Kolb | 525/340 |
| 4,358,559 | 11/1982 | Holcomb et al. | 524/380 |
| 4,446,270 | 5/1984 | Guenthner et al. | 524/433 |
| 4,868,234 | 9/1989 | Tabb et al. | 524/236 |
| 4,882,390 | 11/1989 | Grootaert et al. | 525/340 |
| 4,925,892 | 5/1990 | Tabb et al. | 524/236 |
| 5,086,123 | 2/1992 | Guenthner et al. | 525/326.4 |

FOREIGN PATENT DOCUMENTS

120462A1  3/1984  European Pat. Off. .
182299A2  6/1986  European Pat. Off. .

OTHER PUBLICATIONS

Brullo, R. A., "Fluoroelastomer Rubber for Automotive Future," *Automotive Elastomer & Design*, Jun. 1985.
Brullo, R. A., "Fluoroelastomer Seal Up Automotive Future",: *Materials Engineering*, Oct. 1988.
"Fluorinated Elastomers," Kirk-Othmer, *Encyclopedia of Chemical Technology*, vol. 8, pp. 500-515 (3rd ed., John Wiley & Sons, 1979.

*Primary Examiner*—Kriellion S. Morgan
*Attorney, Agent, or Firm*—Gary L. Griswold; Walter N. Kirn; Robert H. Brink

[57] ABSTRACT

A fluoroelastomer composition is disclosed comprising an elastomeric polymer and a combination of a sulfonium compound and an ammonium or phosphonium compound. Shaped articles comprising the composition are also disclosed.

20 Claims, No Drawings

FLUOROELASTOMER COMPOSITION WITH ORGANO-ONIUM COMPOUNDS

This invention relates to curable fluoroelastomer compositions comprising an elastomeric copolymer of vinylidene fluoride and one or more other fluorine-containing ethylenically-unsaturated monomers, and an organo-onium compound. In another aspect, it relates to a process for curing the composition and to the resulting shaped articles.

Fluoroelastomers, particularly the copolymers of vinylidene fluoride with other ethylenically unsaturated halogenated monomers, such as hexafluoropropene, have particular utility in high temperature applications, such as seals, gaskets, and linings—see, for example, Brullo, R. A., "Fluoroelastomer Rubber for Automotive Applications," *Automotive Elastomer & Design*, June 1985, "Fluoroelastomer Seal Up Automotive Future," *Materials Engineering*, October 1988, and "Fluorinated Elastomers," Kirk-Othmer, *Encyclopedia of Chemical Technology*, Vol. 8, pp. 500–515 (3rd. ed., John Wiley & Sons, 1979).

Fluoroelastomers when cured have good resistance to damage by heat, solvents, corrosive chemicals, and steam. However, in the manufacture of molded products from these polymers, particularly in modern manufacturing methods, e.g., injection molding, the cured polymers generally adhere to the surface of the mold even when mold release agents are sprayed on the mold cavity or incorporated in the polymer, and the shaped article is frequently torn or damaged when removed from the mold. Also, the incorporation of a mold release agent into the polymer can have serious adverse effects on the physical properties of the cured composition, for example, Mooney Scorch and compression set, which can limit the successful commercial use of the cured composition. Deposits of polymer on the mold cavity surface ("mold fouling") and poor release of the shaped vulcanizate from the mold are major reasons for defects, resulting in rejection of the shaped article which adds to the expense of manufacture of such molded articles.

Presently used curing agents for fluoroelastomers include aromatic polyhydroxy compounds, such as polyphenols, used in combination with certain vulcanization accelerators such as ammonium, phosphonium, or sulfonium compounds. Such organo-onium compounds are described, for example, in U.S. Pat. Nos. 4,882,390 (Grootaert et al.), 4,233,421 (Worm), and 5,086,123 (Guenthner et al.).

U.S. Pat. Nos. 4,925,892 and 4,868,234 (Tabb et al.) describes certain fluoroelastomer compositions comprising a quaternary phosphonium compound and a tetraalkylammonium halide which acts as a metal adhesion promotor.

Although conventionally cured fluoroelastomers have many useful properties, generally either the curing of such compositions is too slow for particular applications such as injection molding, or the cured article is difficult to remove from the mold, or the cured article has undesirable physical properties such as high compression set.

Briefly, in one aspect, this invention provides a curable elastomeric composition comprising: (A) elastomer gum comprising interpolymerized units derived from vinylidene fluoride and one or more other fluorine-containing ethylenically unsaturated monomers; (B) a sulfonium compound; and (C) at least one organo-onium compound selected from the group consisting of phosphonium and ammonium compounds.

The compositions of this invention preferably comprise a polyhydroxy compound. Said polyhydroxy compound can be present as a separate compound or as the anionic portion of either or both of said sulfonium compound and said phosphonium or ammonium compound (organo-onium compounds). The compositions preferably contain an acid acceptor.

The invention also provides a process for curing the composition of this invention to give shaped or formed articles, e.g. O-rings, which process comprises shaping and curing the composition of this invention.

The invention further provides shaped or formed articles comprising the compositions of this invention in its cured state.

The combinations of organo-onium compounds used in this invention provide shaped articles with acceptably rapid cure times, desirable physical properties, and excellent mold-release properties without the use of mold-release agents.

The polyhydroxy compound useful in the present invention is one capable of functioning as a crosslinking agent for the gum. Such agents are well known and are described in the art, e.g., U.S. Pat. Nos. 4,259,463 (Moggi et al.), 3,876,654 (Pattison), and 4,233,421 (Worm), and can include aromatic polyhydroxy compounds and aliphatic polyhydroxy compounds, and the derivatives of said compounds. Also, blends of polyhydroxy compounds may be used in this invention.

Representative aromatic, polyhydroxy compounds include the following: di-, tri-, and tetrahydroxybenzenes, naphthalenes, and anthracenes, and bisphenols of the formula

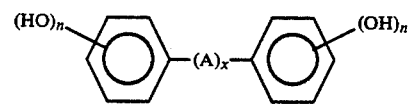

wherein A is a divalent aliphatic, cycloaliphatic, or aromatic radical of 1 to 13 carbon atoms, or a thio, oxy, carbonyl, sulfinyl, or sulfonyl radical; A is optionally substituted with one or more chlorine or fluorine atoms; x is 0 or 1; n is 1 or 2; and any aromatic ring of the polyhydroxy compound can be optionally substituted with at least one atom of chlorine, fluorine, or bromine, or carboxyl, or an alkyl, or an acyl (e.g., a —COR where R is a $C_1$ to $C_8$ alkyl, aryl, or cycloalkyl group) radical. It will be understood from the above bisphenol formula that the —OH groups can be attached in any position (other than number one, i.e., the carbon atoms where the A group is attached to the rings) in either ring. Specific aromatic polyhydroxy compounds include 4,4'-thiodiphenol, isopropylidene-bis(4-hydroxybenzene) ("bisphenol A"), hexafluoroisopropylidenebis(4-hydroxybenzene) ("bisphenol AF") and are described or illustrated in U.S. Pat. No. 4,233,421 (Worm) all of which teachings are incorporated herein by reference.

Representative aliphatic polyhydroxy compounds include fluorinated polyether diols, fluoroaliphatic diols, e.g. 1,1,6,6-tetrahydrooctafluorohexanediol, and others such as those described in U.S. Pat. No. 4,358,559 (Holcomb et al.) and references cited therein. Representative polyhydroxy derivatives of polyhydroxy compounds which can be used as crosslinking agents are described in U.S. Pat. No. 4,446,270 (Guenthner et al.), and include, for example, 2-(4-allyloxyphenyl)-2-(4-hydroxyphenyl) propane.

Preferred polyhydroxy compounds are aromatic polyhydroxy compounds having formula (I) such as bisphenol A and bisphenol AF. A blend of two or more of the polyhydroxy compounds can be used in this invention. When changing from one polyhydroxy compound to another in a given composition, one skilled in the art will be able to select a curing time and temperature that will give a suitable rate of cure for a particular application.

The organo-onium compounds useful in the compositions of this invention are capable of functioning as a curing accelerator. As is known, a phosphonium, ammonium, or sulfonium compound is the conjugate acid of a phosphine, amine, or sulfide and can be formed by reacting said phosphine, amine, or sulfide with a suitable alkylating agent (e.g., an alkyl halide or acyl halide) resulting in the expansion of the valence of the electron donating phosphorous, nitrogen, or sulfur atom and a positive charge on the organo-onium compound. The organo-onium compounds suitable for use in this invention are known and are described in the art. See, for example, U.S. Pat. Nos. 4,882,390 (Grootaert et al.), 4,233,421 (Worm), and 5,086,123 (Guenthner et al.), which descriptions are hereby incorporated by reference.

Said phosphonium compounds include those selected from the group consisting of amino-phosphonium, phosphorane (e.g., triarylphosphorane), and phosphorous containing iminium compounds.

One class of phosphonium or ammonium compounds broadly comprises relatively positive and relatively negative ions (the phosphorus or nitrogen atom generally comprising the central atom of the positive ion), these compounds being generally known as ammonium or phosphonium salts or compounds, preferably having the general formula:

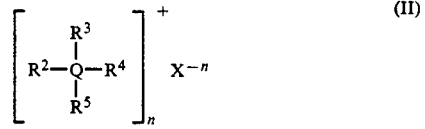
(II)

where Q is nitrogen or phosphorous; X is an organic or inorganic anion, e.g. halide, thiosulfate, formate, cyanate, thiocyanate, tetraphenylborate, perchlorate, nitrate, tetrafluoroborate, hexafluorophosphate, oxalate, stearate, haloacetate, para-toluenesulphonate, $ZnCl_4^{-2}$, $CdCl_4^{-2}$, $NiBr_4^{-2}$, $HgI_3^{-}$, sulfate, acetate, phosphate, phosphonate, hydroxide, alkoxide, phenoxide, trifluoromethane sulfonate, benzene sulfonate, hexachlorophosphate, hexachlorostannate, hexafluoroarsenate, hexafluoroantimonate, 2-mercaptobenzothiazolate, perfluoroalkanesulfonamido anion, or bisphenoxide; n is equal to the valence of the anion X; and $R^2$, $R^3$, $R^4$, and $R^5$ are selected from the group of radicals consisting of alkyl, aryl, alkenyl, or combinations thereof. $R^2$, $R^3$, $R^4$, and $R^5$ can be substituted with chlorine, fluorine, bromine, cyano, —OR, and —COOR moieties where R is selected from the group consisting of $C_1$ to $C_{20}$ alkyl, aryl, aralkyl, and alkenyl. Any pair of said R groups can be connected with each other and the nitrogen or phosphorus atom to form a heterocyclic ring. A preferred class of ammonium or phosphonium compounds has the general formula (II) and at least one of the groups $R^2$, $R^3$, $R^4$, or $R^5$ is alkyl, or alkenyl. Representative of this preferred class are tributylbenzylammonium chloride, tetrabutylammonium chloride, tetrabutylammonium bromide, tetrahexylammonium chloride tributylallylphosphonium chloride, tributylbenzylphosphonium chloride, dibutyldiphenylphosphonium chloride, tetrabutylphosphonium chloride, tributyl(2-methoxy)-propylphosphonium chloride, and triphenylbenzylphosphonium chloride compounds.

Another class of phosphonium compounds useful in this invention are amino-phosphonium compounds some of which are described in the art, see for example, U.S. Pat. No. 4,259,463 (Moggi et al.). The aminophosphonium compounds can be of the ionic type described by Moggi et al. and can have the general formulas

(III)

or

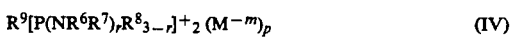
(IV)

Where $R^6$, $R^7$, and $R^8$ can be the same or different, and may be selected from the group consisting of alkyl, cycloalkyl, aryl, aralkyl, oxyalkyl or poly(oxyalkyl) groups with a free or etherified terminal OH function, may contain from 1 to 18, but preferably from 1 to 12 carbon atoms and may contain, as substituents, halogens, CN, OH, or carboalkoxy groups; moreover, $R^6$ and $R^7$ may be connected with each other to form with the nitrogen atom a heterocyclic ring. $R^9$ is a bivalent alkylene, arylene or oxoalkylene radical, n is a whole number between 1 and 4, r is a whole number between 1 and 3, m is 1 or 2 and corresponds to the valence of anion X, p is 1 or 2 such that m times p is 2. X is an anion as described above for Formula II of valency m and may be either organic or inorganic.

Another class of phosphonium compounds useful in this invention are phosphorane compounds such as triarylphosphorane compounds; some of the latter compounds are known and are described in the art, see for example, U.S. Pat. No. 3,752,787 (de Brunner), which descriptions are herein incorporated by reference. Some of the triarylphosphorane compounds useful in this invention have the general formula

(V)

wherein Ar is aryl, selected for example, from phenyl, substituted phenyl, e.g. methoxyphenyl, chlorophenyl, tolyl, and other known groups, e.g. naphthyl. $R^{10}$ and $R^{11}$ are selected from the group consisting of (1) separate groups selected individually from (a) hydrogen, methyl, ethyl, propyl, and carbalkoxy ($C_1$-$C_6$ alkyl) in the case of $R^{10}$, and (b) carbalkoxy ($C_1$-$C_6$ alkyl) cyano, and —$CONH_2$ in the case of $R^{11}$; and (2) a single group which together with the carbon atom to which the single group is attached form a cyclic group selected from

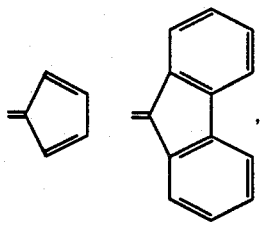

and

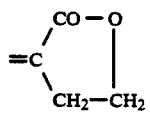

Another class of iminium compounds useful in this invention are known and described in the art, e.g., European Patent Applications 182299A2 and 120462A1 which descriptions are herein incorporated by reference. Some of said iminium compounds have the general formula

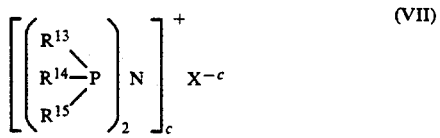
(VII)

wherein $R^{13}$, $R^{14}$ and $R^{15}$ can be the same or different and can be selected from the group consisting of aryl $C_1$ to $C_{20}$ alkyl, $C_3$ to $C_8$ cycloalkyl, $C_7$ to $C_{20}$ aralkyl groups. Said aryl or aralkyl groups can, optionally, be substituted with one or more groups selected from the group consisting of $C_1$ to $C_{20}$ alkyl groups, $C_3$ to $C_8$ cyclo-alkyl groups, halogen atoms and groups having the formula $-N(R^{16})R^{17}$ where $R^{16}$ and $R^{17}$ are the same or different and are selected from the group consisting of $C_1$ to $C_{20}$ alkyl, a $C_3$ to $C_8$ atom cycloalkyl, and phenyl groups. X is an anion such as those described above and c is the valence of X.

Representative phosphonium compounds include tetramethylphosphonium chloride, tetrabutylphosphonium chloride, tributylbenzyl phosphonium chloride, tributylallylphosphonium chloride, tetraphenylphosphonium chloride, benzyltris(dimethylamino)phosphonium chloride, and bis(benzyldiphenylphosphine)iminium chloride.

Sulfonium compounds useful in this invention are known and described in the art, e.g., see U.S. Pat. No. 4,233,421 (Worm). Briefly described, a sulfonium compound is a sulfur-containing organic compound in which at least one sulfur atom is covalently bonded to three organic moieties having from 1 to 20 carbon atoms by means of carbon-sulfur covalent bonds and is ionically associated with an anion. Said organic moieties can be the same or different. The sulfonium compounds may have more than one relatively positive sulfur atom, e.g. $[(C_6H_5)_2S^+(CH_2)_4S^+(C_6H_5)_2]\ 2Cl^-$, and two of the carbon-sulfur covalent bonds may be between the carbon atoms of a divalent organic moiety, i.e., the sulfur atom may be a heteroatom in a cyclic structure.

A preferred class of sulfonium compounds are salts having the formula

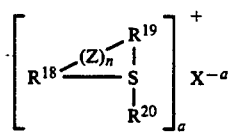

wherein $R^{18}$, $R^{19}$, and $R^{20}$ can be the same or different, provided that at least one of such groups is aromatic, and such groups can be selected from aromatic radicals having 4 to 20 carbon atoms (e.g., substituted and unsubstituted phenyl, thienyl, and furanyl) and alkyl radicals having 1 to 20 carbon atoms. The alkyl radicals include substituted alkyl radicals (for example, substitutents such as halogen, hydroxy, alkoxy, aryl. Z is selected from the group consisting of oxygen; sulfur; $>S=O$; $>C=O$; $-SO_2-$; $-N(R^{21})-$; where $R^{21}$ is aryl or acyl (such as acetyl, benzoyl, etc.); a carbon-to-carbon bond; and $-C(R^{22})(R^{23})-$ where $R^{22}$ and $R^{23}$ are selected from the group consisting of hydrogen, alkyl radicals having 1 to 4 carbon atoms, and alkenyl radicals having 2 to 4 carbon atoms, and n is zero or 1; X is an inorganic or organic anion such as those described above; and a is the valence of X.

Suitable fluorine-containing ethylenically unsaturated monomers for use in the preparation of the fluoroelastomer gums useful in this invention include the terminally unsaturated monoolefins typically used for the preparation of fluorine-containing polymers such as hexafluoropropene, chlorotrifluoroethylene, 2-chloropentafluoropropene, perfluoroalkyl vinyl ethers, e.g., $CF_3OCF=CF_2$ or $CF_3CF_2OCF=CF_2$, tetrafluoroethylene, 1-hydropentafluoropropene, 2-hydropentafluoropropene, dichlorodifluoroethylene, trifluoroethylene, 1,1-dichlorofluoroethylene, vinyl fluoride, and mixtures thereof. Fluorine-free terminally unsaturated monoolefin comonomers, e.g., ethylene or propylene may also be used as comonomers.

The compositions of this invention can be compounded with processing agents, such as those conventionally used to aid in the molding or extrusion of the formulation, e.g., carnauba wax as described in U.S. Pat. No. 3,753,937 (Stivers). Another type of processing aid which can be used in this invention is diorgano sulfur oxides, e.g. dichlorodiphenyl sulfone such as those described in U.S. Pat. No. 4,287,320 (Kolb).

Fluoroaliphatic sulfonamides can also be added, including those of the formula $R_fSO_2NHR''$, where $R''$ is a hydrogen atom or alkyl radical having, for example, from 1 to 20 carbon atoms, preferably from 1 to 12 carbon atoms, $R_f$ is a fluoroaliphatic radical such as a perfluoroalkyl, e.g., $C_nF_{2n+1}$ where n is 1 to 20, or perfluorocycloalkyl, e.g., $C_nF_{2n-1}$ where n is 3 to 20, such compounds being described, for example, in U.S. Pat. No. 5,086,123 (Guenthner et al.). The fluoroaliphatic sulfonamide is preferably a perfluoroalkanesulfonamide and may be added as a separate compound, or as the anion of an organo-onium compound.

Fillers are often added to the polymers discussed above to improve the physical properties of the cured composition or vulcanizate. When a filler is employed it is added to the vulcanization recipe in amounts of up to about 100 parts per hundred parts by weight of rubber, preferably between about 1 and 50 parts per hundred parts by weight of the rubber. Examples of fillers which may be used are reinforcing thermal grade carbon blacks or non-black pigments of relatively low reinforcement characteristics such as clays, barytes, etc.

The organo-onium compounds and polyhydroxy compound can be added to the gum in the form of finely divided solids by milling said compounds into the copolymer gum stock. Thus mixed, the gum stock can generally be stored at room temperature for extended periods, e.g., up to two years or more. Prior to curing, an acid acceptor is milled into the organo-onium-polyhydroxy-containing gum stock, after which the storage life of the stock is more limited. Acid acceptors can be inorganic or organic compounds. Organic acid acceptors include sodium stearate and magnesium oxalate. However, acid acceptors are generally inorganic bases and include magnesium oxide, lead oxide, calcium oxide, calcium hydroxide, dibasic lead phosphate, zinc oxide, barium carbonate, strontium hydroxide, calcium carbonate, etc. The preferred acid acceptors are magnesium oxide and calcium hydroxide. The acid acceptors can be used singly or in combination and preferably are used in amounts preferably ranging from 2 to 25 parts per 100 parts by weight of the polymer. All of the components of the curing system may be admixed prior to their incorporation into the elastomer gum without departing from the scope of this invention.

The polyhydroxy or the fluoroaliphatic sulfonamide compound may also be added as the anion of the organo-onium compounds. These organo-onium compounds (with polyhydroxy or fluoroaliphatic sulfonamide anions) can be prepared by reacting the metal salt, e.g., sodium, calcium, etc., of the polyhydroxy or fluoroaliphatic sulfonamide compound with an equimolar amount of a organo-onium halide. Said metal salt can be made by reacting the polyhydroxy or fluoroaliphatic sulfonamide compound with a base, e.g. sodium methoxide, in a suitable solvent, e.g. methanol. In some instances it may also be desirable to add one or more diorgano sulfur oxide compounds, and other conventional adjuvants or ingredients, e.g. retarding agents, processing aids, reinforcing agents, and fillers, to the gum stock.

The relative amounts of said polyhydroxy and organo-onium compounds are present in the composition in such amounts as to provide the desired cure of the composition when mixed with acid acceptor. Representative proportions of components of the curing system are set forth below in Table I. All amounts referred to therein are in parts per 100 parts by weight rubber abbreviated "phr" or in millimoles per hundred grams rubber abbreviated "mmhr". Unless otherwise indicated the "rubber" means the elastomer copolymer or gum. These proportions are general ranges and the particular amount for each particular cure time and temperature will become apparent to those skilled in the art.

TABLE 1

| Formulation Ranges | |
| --- | --- |
| Component | Amounts |
| Acid acceptor | 0.5 to 40 phr |
| Organo-onium compounds (total) | 0.2 to 5 mmhr |
| Polyhydroxy compound | 0.3 to 10 mmhr |

Useful cured elastomers are obtained within the aforementioned formulation limits, although elastomeric products having particularly desired properties may be obtained by varying the relative amounts of the components within the specified ranges. Preferably, compositions comprise 1.0 to 3.0 mmhr organo-onium compounds and 3.0 to 6.0 mmhr polyhydroxy compound. The sulfonium is preferably 25 to 85 mole %, most preferably 50 to 75 mole % based on total organo-onium moles.

In accordance with this invention, the desired amount of acid acceptor, organo-onium compounds and polyhydroxy compound, diorgano sulfur oxide compounds, if any, and other conventional adjuvants or ingredients are added to the unvulcanized copolymer (i.e., gum stock) and intimately admixed therewith or compounded by employing any of the usual rubber mixing devices such as Banbury mixers, roll mills, or any other convenient mixing device.

For best results the temperature of the mixture on the mill should not rise above about 120° C. During milling it is necessary to distribute the components and adjuvants uniformly throughout the curable polymer. The curing process typically comprises extrusion or pressing the compounded mixture in a mold e.g., a cavity or a transfer mold, and subsequent oven curing. The composition of this invention is particularly useful for injection molding. Pressing of the compounded mixture (press cure) is conducted at a temperature between about 95° C. and about 230° C., preferably between about 150° C. and about 205° C. for a period of from 1 minute to about 15 hours, usually from 5 minutes to 30 minutes. A pressure of between about 700 kPa and about 20,600 kPa, preferably between about 3,400 kPa and about 6,800 kPa is imposed on the compounded mixture in the mold. The molded vulcanizate is then usually post cured (oven cured) at a temperature between about 150° C. and about 315° C., usually at about 232° C. for a period of from about 2 hours to 50 hours or more depending on the cross-sectional thickness of the sample. For thick sections, the temperature during the post cure is usually raised gradually from the lower limit of the range to the desired maximum temperature selected. For thinner cross-sections, e.g., less than 5 mm, the vulcanizate or cured sheet section may be put into the oven at the desired maximum temperature. The maximum temperature used is preferably about 260° C. and is held at this value for about 4 hours or more.

One major utility of the vulcanized, highly fluorinated elastomers of this invention lies in their use as shaft seals in automotive applications, gaskets, O-rings and the like, for containing fluids under pressure at elevated temperatures, as, for example, in hydraulic systems in aircraft, or as components of reactors in the processing of chemicals.

The following examples are offered to aid in a better understanding of the present invention and are not to be unnecessarily construed as limiting the scope thereof.

EXAMPLES

Examples 1–2 and Comparative Examples C1–C5

Fluorine-containing polymer FC-2145, a copolymer of vinylidene fluoride (60 wt. %) and hexafluoropropene (40 wt %) with a Mooney viscosity, ML 1+10 @121° C., of about 26–31 (available from 3M Co.), was cured with bisphenol AF crosslinking-agent (available from Aldrich Chemical Co.) and onium accelerator, and the physical properties of the resulting cured polymers were determined. 100 g of the fluorine-containing polymer was mixed with the following curing and compounding ingredients: 30 g of carbon black (Thermax MT ™, ASTM N990); 0.5 g CaCO₃; 1.0 g dichlorodiphenylsulfone; 3 g of magnesium oxide (Maglite D ™); and 6 g calcium hydroxide. The compositions also contained bisphenol AF and one or more of the following organo-onium compounds:

Sulfonium A, which is

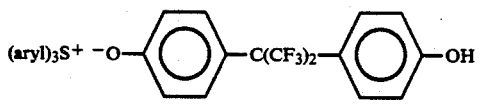

which was prepared by reacting "triarylsulfonium chloride" purchased from Austin Chemical Co. with the sodium salt of bisphenol AF.

Phosphonium B, which is

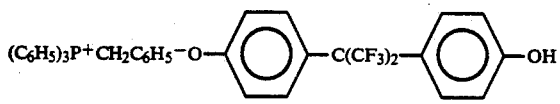

which was prepared by reacting triphenylbenzyl phosphonium chloride (available from Aldrich Chemical Co.) with the sodium salt of bisphenol AF.

Ammonium C, which is

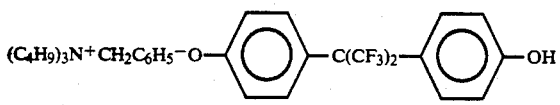

which was prepared by reacting tributylbenzylammonium chloride (available from Aldrich Chemical Co.) with the sodium metal salt of bisphenol AF.

Sulfonium D, which is $(aryl)_3S^+ \, C_8F_{17}SO_2N^-(CH_3)$ which was prepared by reacting "triarylsulfonium chloride" purchased from Austin Chemical Co. with the sodium salt of N-methyl-perfluorooctanesulfonamide.

The "triarylsulfonium chloride" from Austin Chemical Company is said to be a mixture containing triphenylsulfonium chloride, diphenyl[4-phenylthio)phenyl] sulfonium chloride and (thiodi-4,1-phenylene) bis(diphenylsulfonium) dichloride.

The total amount of bisphenol AF and fluoroaliphatic sulfonamide in each Example and Comparative Example was 6.54 mmoles per hundred grams of rubber (mmhr). The onium and bisphenol AF composition of each Example and Comparative Example is summarized in Table 2.

The cure characteristics and rheological properties of the uncured compositions were obtained using ASTM D 2084-75 with no preheat, an oscillator frequency of 100 cpm and a 3° arc, at 177° C. Minimum torque ($M_L$), highest torque attained during specified period of time when no plateau or maximum torque is obtained ($M_H$), time for torque to increase 0.2 N.m above $M_L$ ($t_s2$), and time for torque to reach $M_L + 0.9\, M_H - 0.9\, M_L$ ($t_c'(90)$) were determined. The results are shown in Table 2.

The compounded polymer compositions were press-cured for 10 min. at 177° C. and post-cured for 16 hours at 260° C. and physical properties determined. Tensile strength at break, elongation at break, and modulus at 100% elongation were obtained using ASTM Method D-412-80 on a sample cut from 1.8 mm sheet of cured polymer with ASTM Die D. Hardness (Shore A-2) was measured at room temperature on cured samples according to ASTM Method D-2240-81 using Shore Instrument and Mfg. Co. "A-2" hardness measuring device. Compression set was determined using ASTM Method D-395-78, Method B, on cured (10 min. press cure at 177° C. followed by 16 hours postcure at 260° C.) O-rings after 25% compression for 70 hours at 200° C. Compression set results are reported as percent of the compression remaining. The resulting physical properties of the cured polymers are summarized in Table 2.

TABLE 2

| Example | C1 | C2 | C3 | C4 | C5 | C6 | C7 | C8 | 1 | 2 | 3 | 4 |
|---|---|---|---|---|---|---|---|---|---|---|---|---|
| COMPOSITION | | | | | | | | | | | | |
| Bisphenol AF (mmhr) (b) | 5.78 | 5.27 | 4.54 | 4.14 | 6.03 | 5.27 | 6.03 | 5.27 | 5.27 | 5.27 | 5.27 | 5.27 |
| Sulfonium A (mmhr) (c) | 0.76 | 1.27 | 2.00 | 2.40 | | | | | 0.76 | 0.76 | | |
| Phosphonium B (mmhr) (d) | | | | | 0.51 | 1.27 | | | 0.51 | | 0.51 | |
| Ammonium C (mmhr) (e) | | | | | | | 0.51 | 1.27 | | 0.51 | | 0.51 |
| Sulfonium D (mmhr) (f) | | | | | | | | | | | 0.76 | 0.76 |
| total onium (mmhr) | 0.76 | 1.27 | 2.00 | 2.40 | 0.51 | 1.27 | 0.51 | 1.27 | 1.27 | 1.27 | 1.27 | 1.27 |
| RHEOLOGY DATA | | | | | | | | | | | | |
| $M_L$, N·m | 0.90 | 0.90 | 0.90 | 0.90 | 0.90 | 0.90 | 0.90 | 0.90 | 0.90 | 0.90 | 0.90 | 0.90 |
| $t_s2$ (minutes) | 10.2 | 8.2 | 4.5 | 2.8 | 6.4 | 2.7 | 4.0 | 2.5 | 3.5 | 3.2 | 3.0 | 2.4 |
| $t_c'(90)$ (minutes) | 21.0 | 12.3 | 8.0 | 4.4 | 14.6 | 4.0 | 12.8 | 3.5 | 5.5 | 4.8 | 4.1 | 5.1 |
| $M_H$, N·m | 9.7 | 9.6 | 10.7 | 10.2 | 11.8 | 13.3 | 11.9 | 13.3 | 12.4 | 12.4 | 12.4 | 12.3 |
| CURED PROPERTIES | | | | | | | | | | | | |
| Tensile, MPa | | 15.56 | 13.72 | 13.23 | | 15.68 | | 15.1 | 14.58 | 15.16 | 14.44 | 15.03 |
| Elongation, % | | 210 | 203 | 201 | | 163 | | 155 | 180 | 185 | 188 | 182 |
| 100% modulus | | 5.25 | 5.67 | 5.56 | | 7.69 | | 8.03 | 6.51 | 6.82 | 5.74 | 6.61 |
| Hardness (Shore A2) | | 76 | 78 | 76 | | 78 | | 78 | 79 | 79 | 77 | 77 |
| Compression set % | | 14.9 | 17.5 | 19.6 | | 16.5 | | 24.4 | 15.9 | 21.8 | 21.0 | 24.0 |

The effect of different levels of organo-onium accelerator compounds on the cure speed of the fluoroelastomer compositions can be seen in the $t_c'(90)$ or time to 90% of cure. The more onium compound present in the composition, the faster the cure speed. But at equal levels of onium compound, the phosphonium and ammonium accelerators alone are each more effective than sulfonium accelerator alone. However, there was an unexpected synergism when the sulfonium was used in o combination with phosphonium or ammonium accelerators. As shown in Table 2, at a total onium concentration of 1.27 mmhr, $t_c'(90)$ values were, respectively 12.3, 4.0 and 3.5 minutes for the single onium-containing sulfonium, phosphonium and ammonium compound-containing compositions (Comparative Examples C2, C6 and C8). The mixed sulfonium and phosphonium, and the mixed sulfonium and ammonium compositions, at the same total onium level of 1.27 mmhr had $t_c'(90)$ values of 5.5 and 4.8 min., respectively (times almost as fast as compositions containing only phosphonium or ammonium accelerators with $t_c'(90)$ values of 4.0 and 3.5 minutes, respectively).

Assuming a close to linear relationship between cure-rate and moles of onium compounds, in the range tested, the expected $t_c'(90)$ value for compositions containing mixtures of onium compounds can be calculated by the following equation:

$$t_{calc} = (x)(T_x) + (y)(T_y)$$

where x and y (x+y=1) are respectively the mole fractions of the sulfonium and phosphonium or ammonium compounds in the mixture of onium compounds in the composition. $T_x$ is the $t_c'(90)$ of the sulfonium compound and $T_y$ is the $T_c'(90)$ of the phosphonium or ammonium compound. $T_x$ and $T_y$ represent the $t_c'(90)$ of compositions containing only one onium compound when the levels of each onium compound alone is the same as the total level of organo-onium compounds in the mixture under consideration. Thus, at 1.27 mmhr, $T_x = 12.3$ min., and $T_y = 4.0$ min., from Comparative Examples C2 and C6, respectively.

Thus, the calculated $t_c'(90)$ for Example 1, using the above equation, is x equals 0.76/1.27=0.60, y equals 0.51/1.27=0.40, and $t_{calc} = (0.60) (12.3) + (0.40) (4.0) = 9.0$ minutes, almost double the actual value of 5.5 minutes obtained in Example 1. For Example 2, at 1.27 mmhr, $T_x = 12.3$ min. and $T_y = 3.5$ min., from Comparative Examples C2 and C8, respectively, and the calculated $t_c'(90)$ for Example 2, using the above equation, is x equals 0.76/1.27=0.60, y equals 0.51/1.27=0.40, and $t_{calc} = (0.60) (12.3) + (0.40) (3.5) = 8.8$ minutes, again almost double the actual value of 4.8 minutes obtained in Example 2.

Table 2 also shows that a much higher level of organo-sulfonium compound by itself is necessary in order to attain similar curing speed in comparison with the phosphonium and ammonium compounds (see Comparative Example C4 compared to Examples C6 and C8). Table 2 also shows that this increase in sulfonium accelerator has detrimental effects on physical properties, e.g., compression set (see Comparative Example C2 compared to Examples C3 and C4).

The Examples summarized in Table 2 illustrate the usefulness of the present invention. They illustrate that there is an unexpected synergism with respect to cure speed, in compositions with a combination of sulfonium and ammonium or phosphonium compounds, while maintaining excellent physical properties of the final cured article.

In addition to the good physical properties of the cured fluoroelastomer compositions of this invention containing mixed sulfonium and phosphonium or mixed sulfonium and ammonium compounds, these compositions also show excellent properties with respect to injection molding. In injection molding it is beneficial to have excellent mold release, combined with fast cure-speed and excellent physical properties of the cured articles, e.g., O-rings. These requirements have not been met simultaneously with currently used and described cure systems. Excellent mold release allows automated operations, without requiring operators to manually remove parts that stick in the mold cavities. Fast-cure cycles are necessary in order to make the whole operation economically competitive, while the physical properties of the cured article should not be sacrificed, since they determine the actual use parameters of the part, e.g., compression set and sealing force of O-rings.

The following Example 5 and Comparative Example C9 demonstrate the superior mold release properties and easier injection molding characteristics of a fluoroelastomer composition of this invention containing a mixture of sulfonium and phosphonium cure accelerators compared to a composition containing only a phosphonium cure accelerator. Fluoroelastomer compositions used in these examples are shown in the following table. The composition of C9 is a state-of-the-art composition for fabrication of O-rings by injection molding. Amounts are in parts by wt. unless indicated otherwise.

|  | Example 5 | Comparative Example C9 |
|---|---|---|
| Fluoroelastomer | 100 | 100 |
| Bisphenol AF | 5.25 | 5.25 |
| Sulfonium A, mmhr | 0.77 | — |
| Phosphonium B, mmhr | 0.51 | 1.0 |
| MT black | 30 | 30 |
| Ca(OH)$_2$ | 6 | 6 |
| MgO | 3 | 3 |
| Dichlorodiphenyl Sulfone | 1.0 | 1.0 |
| Carnauba wax | 0.75 | 0.75 |

The compositions were milled on a two-roll rubber mill, stored overnight at room temperature and remilled the next morning. Immediately after remilling, the compositions were cut into 20 mm×6 mm strips preparatory to feeding into the injection molding machine.

An injection molding machine, DESMA 966.053 ZO, manufactured by Klockner Ferromatik Desma GmbH of Germany, was used for the fabrication of O-rings.

| Machine specifications: | |
|---|---|
| Mold closing force | 50 kN |
| Injection piston diameter | 55 mm |
| Injection piston stroke | 120 mm |
| Injection pressure | 200 MPa (2000 atm) (maximum) |
| Injection speed | 40 cm/sec. (maximum) |
| Plastication unit | |
| screw diameter | 30 mm |
| screw rpm | 30–220 |
| maximum power | 7.5 kW |

Two different O-ring molds (A and B) with different numbers and dimensions of cavities and other layout differences were used. The molds of both A and B were made of stainless steel (STAVAX ESR). The molds were cleaned and conditioned prior to use as follows: (1) ultrasonic cleaning in a potassium hydroxide/detergent solution at 80° C. for 15 min. (after 30 min. warm-up in the solution), then rinsed with deionized water and dried; (2) Mold surface abraded with 50-150 micrometer glass beads under two atmospheres pressure; and (3) Step 1 repeated and molds stored overnight before using.

|  | Mold | |
| --- | --- | --- |
|  | A | B |
| Number of cavities | 6 | 4 |
| O-ring diameter, mm | 26.5 | 50 |
| O-ring cross-section, mm | 3.50 | 2.90 |
| Runner length, mm | 33 | 13 |
| Sprue length, mm | 85 | 29 |
| Sprue base diameter, mm | 9.0 | 5.2 |
| Nozzle (8 mm) and check valve | yes | yes |
| Cavities in separate inserts | yes | no |
| Pressure sensor in one cavity | yes | no |
| Temp. sensors close to cavities | yes | yes |

Steady state O-ring injection molding conditions were used as shown in the following table.

| Composition of Example | Mold | | | |
| --- | --- | --- | --- | --- |
|  | A | A | B | B |
|  | 5 | C9 | 5 | C9 |
| O-ring molding conditions |  |  |  |  |
| Mold temperature, °C. | 197 | 193 | 217 | 210 |
| Plastication stroke, mm | 8.0 | 8.2 | 5.5 | 5.5 |
| Backpressure, MPa (atm) | 0.3(3) | 0.4(4) | 0.5(5) | 0.5(5) |
| Rpm screw, % (of maximum) | 35 | 35 | 35 | 35 |
| Extruder temperature, °C. | 60 | 60 | 60 | 60 |
| Barrel temperature, °C. | 95 | 95 | 95 | 95 |
| Heating time, sec. | 110 | 130 | 45 | 47 |
| Holding time, sec. | 90 | 115 | 33 | 36 |
| Plasticizing delay time, sec | 100 | 117 | 35 | 37 |

As injection molding of O-rings using the composition of Example 5 using mold A was carried out, the stroke of the injection piston was decreased in increments of 0.1 mm. After 5 shots or charges of the composition, the cavity pressure was recorded. The following table summarizes the plastication stroke, shot weight and cavity pressure, after 60 seconds, for injection molding using the composition of Example 5.

| Plastication stroke, mm | Shot weight, g | Cavity pressure, MPa, (atm) |
| --- | --- | --- |
| 8.4 | 22.98 | 3 (30) |
| 8.3 | 22.82 | 2 (20) |
| 8.2 | 22.65 | 1 (10) |
| 8.1 | 22.11 | 1 (10) |
| 8.0 | 22.11 | 1 (10) |
| 7.9 | 21.95 | 1 (10) |

The following observations were made during steady state O-ring production conditions: Mold sticking: very low forces were needed to remove the O-ring from the mold. No pressurized air—a typical means of removing injection molded parts—was needed to remove the O-rings. The low cavity pressure indicates the ease of injection molding for this composition of the invention. Tearing: Very few instances of tearing of O-rings, flash, or runners was observed during demolding. (In typical runs with other fluoroelastomer compositions, the part and runners would tear without use of pressurized air for part removal from the mold.) Sprue behavior: Even though the sprue stuck in the upper part of the mold in some of the shots, it was easily removed without tearing, thus not interrupting steady state production of the O-rings. Mold fouling: After a total of 101 shots, under several different conditions, no deposit was detected in the mold cavities or runner system.

As injection molding of O-rings using the composition of Comparative Example C9 using mold A was carried out, the stroke of the injection piston was decreased in increments of 0.1 mm. After 5 shots or charges of the composition, the cavity pressure was recorded. However, attempts to run the process under exactly the same injection machine settings as for the composition of Ex. 5 failed. The sprue, sticking badly in the upper part of the mold, caused interruptions that did not allow the steady state conditions desired. Thus, a longer holding time (115 sec.) and a longer plastication delay time (117 sec.) were required.

The following table summarizes the plastication stroke, shot weight and cavity pressure, after 60 seconds, for injection molding the composition of Comparative Example C9.

| Plastication stroke, mm | Shot weight, g | Cavity pressure, MPa (atm) |
| --- | --- | --- |
| 8.5 | 22.78 | 11 (110) |
| 8.4 | 22.55 | 10 (100) |
| 8.3 | 22.46 | 3 (30) |
| 8.2 | 22.38 | 4 (40) |

Reducing the injection stroke to 8.1 mm was not attempted because the ,rubber cushion, in the barrel could become too thin, risking machine damage. (Note that there was no problem with going as low as a 7.9 mm injection stroke with the composition of Example 5.) Note the much higher cavity pressure for the injection molding of the composition of Comparative Example C9 compared with that for Example 5. The following observations were made during steady state O-ring production conditions using the composition of Comparative Example C9: Mold sticking: Pressurized air was needed to remove the O-rings from the molds. Without pressurized air, demolding was difficult, with parts and runners breaking. Tearing: Using pressurized air, very little tearing of O-rings, runners, or flash was observed during demolding. (Without pressurized air, parts frequently broke). Sprue behavior: When the sprue stuck in the upper part of the mold in some of the shots, it was difficult to remove. Mold fouling: After a total of 100 shots, under several different conditions, no deposit was detected in the mold cavities or runner system.

Injection molding of O-rings using the composition of Example 5 using mold B was carried out. The following observation were made during steady state O-ring production conditions: Mold sticking: Very low forces were needed to remove O-rings from the mold. This was true for all mold temperatures used including 219° C. No pressurized air—a typical means of removing injection molded parts—was needed to remove the O-rings. Tearing: Very few O-rings, runners, or flash broke during demolding. Sprue behavior: Until shot 135 temperatures above 217° C., no sticking of the sprue in the upper half of the mold was encountered. Even though the sprue stuck in the upper part of the mold in some of the shots, it was easily removed without tearing, thus not interrupting steady state production of the O-rings. Mold fouling: After a total of 157 shots, under several different conditions, no deposit was detected in the mold cavities or runner system.

Injection molding of O-rings using the composition of Comparative Example C9 using mold B was carried out. The following observation were made during steady state O-ring production conditions. Mold sticking: Pressurized air was needed to remove the O-rings from the molds. Without pressurized air, demolding was difficult, with parts and runners breaking. Tearing: Using pressurized air, very little tearing of O-rings, runners, or flash was observed during demolding. (Without pressurized air, parts frequently broke). Sprue behavior: At a temperature of 211° C. and a heating time of 45 seconds, sprue sticking problems began to occur (as well as flow defects on O-rings.) Attempts to reduce cycle time resulted in bad sprue sticking and flow defects. Mold fouling: After a total of 210 shots, under several different conditions, no deposit was detected in the mold cavities or runner system.

The results of injection molding of a fluoroelastomer composition of this invention containing a mixture of sulfonium and phosphonium cure accelerators (Example 5), and a comparative fluoroelastomer composition containing only a phosphonium cure accelerator (Comparative Example C9), will now be summarized.

Under identical machine injection molding settings and mold temperatures, a significantly lower mold cavity pressure was measured for the compositions of Example 5 compared with the comparative composition of Comparative Example C9. Under the same machine conditions, the composition of Example 5 required a smaller injection piston stroke to fill the mold to the same level than the composition of Comparative Example C9, thus showing the better flow characteristics of the composition of Example 5. The composition of Example 5 had shorter heating and cycle times than the composition of Comparative Example C9. The composition of Example 5 ran trouble-free at higher molding temperatures. O-rings prepared from the composition of Example 5 could be easily demolded without pressurized air, while attempts to remove O-rings prepared from comparative composition of Comparative Example C9 without pressurized air resulted in broken parts.

Various modifications and variations of this invention will become apparent to those skilled in the art without departing from the scope and spirit of this invention.

What is claimed is:

1. An elastomeric composition comprising:
   (a) an elastomeric polymer comprising interpolymerized units derived from vinylidene fluoride and at least one other fluorine-containing ethylenically unsaturated monomer;
   (b) a sulfonium compound; and
   (c) at least one organo-onium compound selected from the group consisting of ammonium and phosphonium compounds.

2. The composition of claim 1 further comprising a polyhydroxy compound or polyhydroxy anion.

3. The composition of claim 2 further comprising an acid acceptor.

4. The composition of claim 1 wherein said sulfonium, ammonium, and phosphonium compounds are present in a total amount of from 0.2 to 5.0 mmoles per 100 g of said elastomeric polymer.

5. The composition of claim 1 wherein said sulfonium, ammonium, and phosphonium compounds are present in a total amount of 1.0 to 3.0 mmoles per 100 g of said elastomeric polymer.

6. The composition of claim 5 wherein said sulfonium compound is present as 25 to 85 mole % of the total moles of organo-onium compounds.

7. The composition of claim 5 wherein said sulfonium compound is present as 50 to 75 mole % of the total moles of organo-onium compounds.

8. The composition of claim 1 wherein said sulfonium compound is a triaryl sulfonium compound.

9. The composition of claim 1 wherein said phosphonium compound is a triphenylbenzyl phosphonium compound.

10. The composition of claim 1 wherein said ammonium compound is a tributylbenzyl ammonium compound.

11. The composition of claim 1 wherein said elastomeric polymer comprises interpolymerized units derived from vinylidene fluoride and one or more monomers selected from the group consisting of hexafluoropropene and tetrafluoroethylene.

12. The composition of claim 11 wherein said elastomeric polymer further comprises interpolymerized units derived from one or more monomers selected from the group consisting of propene and ethylene.

13. The composition of claim 1 further comprising a fluoroaliphatic sulfonamide or fluoroaliphatic sulfonamide anion.

14. The composition of claim 2 wherein said polyhydroxy compound or polyhydroxy anion is an aromatic bisphenol compound or anion.

15. The composition of claim 3 in its cured state.

16. Shaped article comprising the composition of claim 15.

17. The shaped article of claim 16 wherein said shaped article is an O-ring.

18. Method of making a shaped elastomeric article comprising
   (A) mixing an elastomeric polymer comprising interpolymerized units derived from vinylidene fluoride and at least one other fluorine-containing ethylenically-unsaturated monomer, a sulfonium compound, at least one organo-onium compound selected from the group consisting of ammonium and phosphonium compounds, a polyhydroxy compound or anion, and an acid acceptor;
   (B) shaping the resulting mixture in a mold at an elevated temperature into the form of an article; and
   (C) heating the formed article in the mold to cure said mixture.

19. The method of claim 18 wherein said shaping and heating comprises injection molding.

20. The method of claim 19 further comprising (D) automated removal of the shaped article from the mold.

* * * * *